Patented June 15, 1943

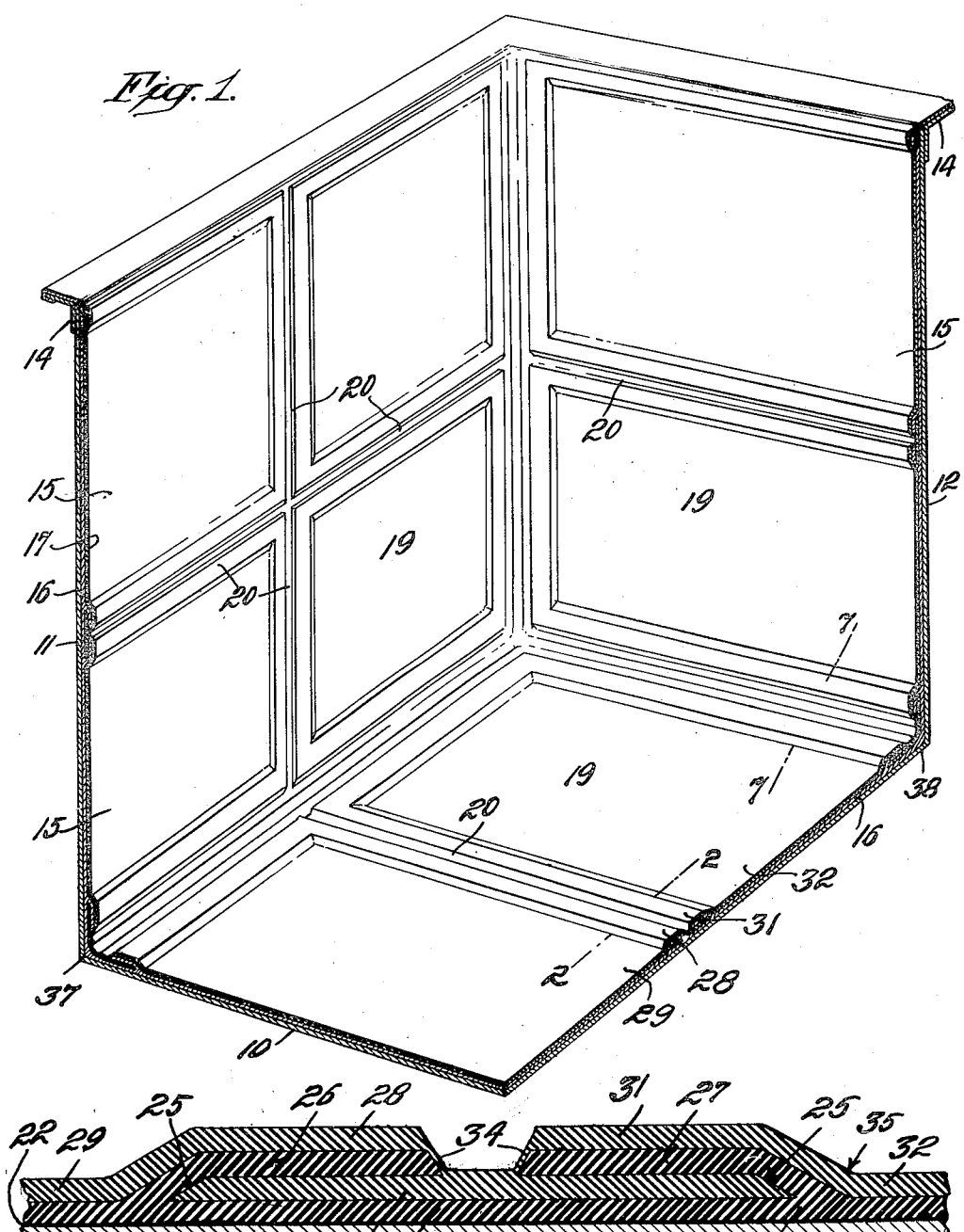

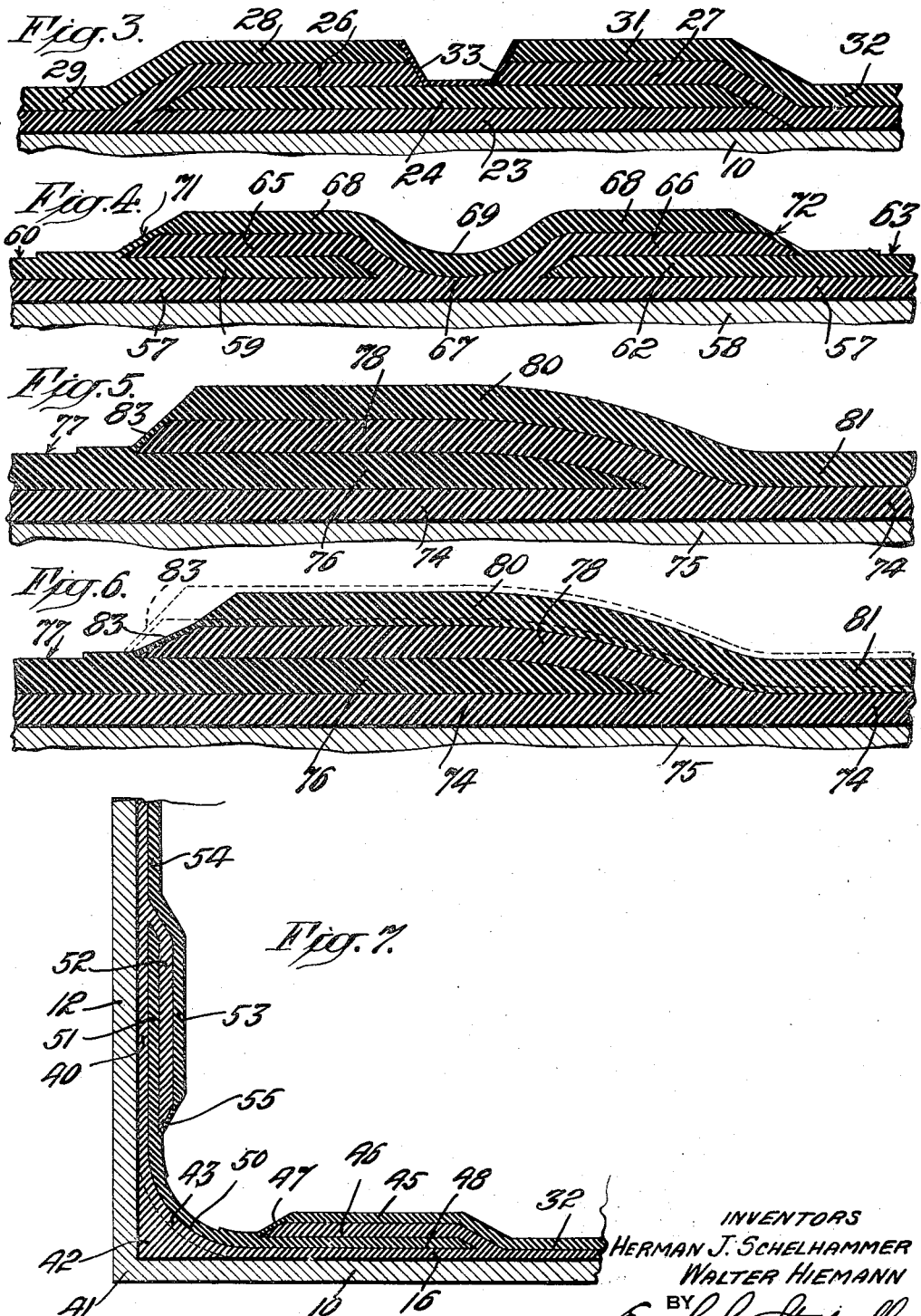

2,321,777

UNITED STATES PATENT OFFICE 2,321,777

HARD RUBBER LINING FOR RECEPTACLES

Herman J. Schelhammer, Whitestone, and Walter Hiemann, New York, N. Y., assignors to American Hard Rubber Company, New York, N. Y., a corporation of New York Application July 9, 1940, Serial No. 344,540

5 Claims. (Cl. 220—63)

The invention relates to an improvement in corrosion-resisting linings and coverings for receptacles adapted to contain acids, alkalis and other corrosive fluids, and more particularly to an improvement in the joints formed by the overlapping margins of adjacent panels or sections of such linings. The corrosion-resisting lining may be composed of a variety of substances suitable for the purpose. Usually they are composed of rubber or synthetic substitutes for rubber. For the sake of simplicity of description the corrosion-resisting lining will be referred to as rubber, but it will be understood that this is a term of description rather than of limitation. The walls (including the top and bottom closures) of the receptacles to be lined are commonly composed of metal, such as steel, although other materials, such as wood, concrete, or brick, are sometimes used.

The coefficient of expansion and of contraction of hard rubber or ebonite differs from that of steel. The coefficient of linear expansion of steel at 100° F. is 0.00000734 per 1° F.; that of hard rubber, 0.00004 per 1° F. A sheet of hard rubber will contract about 0.042 inch per linear foot more than steel, per 100° F. drop in temperature. This difference in the ratio of contraction of hard rubber and steel may become a matter of serious consequence when a hard rubber-lined receptacle, such as a stationary tank or a tank car, is exposed to temperatures below about 30° F., at which point hard rubber begins to lose its elasticity and become brittle. At temperatures ranging below 0° F., and especially at such low temperatures as −40° F. the hard rubber lining may contract so much relatively to the steel as to develop cracks at various points, thereby permitting the corrosive fluids contained in the tank to attack the metal of which its shell is composed. The larger the tank and the lower the temperature the greater the number and size of the cracks will be. On the other hand, although hard rubber has a greater coefficient of expansion than steel, this is usually a matter of little consequence at the higher temperatures, those above about 80° F., at which point the hard rubber progressively softens and by expanding in thickness adjusts itself to structure conditions without disruption from its supporting wall.

The problem then of properly lining steel and other metal tanks with a layer or coating of corrosion-resisting substance, whether hard rubber or its equivalent, where the tank may be exposed to temperatures ranging down to about −40° F. is largely one of preventing the lining from cracking at the lower temperatures to such extent as to permit the corrosive fluids to attack the metal shell of the tank. The problem is an old one, and prior to the present invention, it had not, so far as we are aware, been solved for all conditions under which hard rubber-lined tanks may be used.

It is common practice in lining metal tanks with rubber, or the like, to attach superposed layers of soft and hard rubber to the inner surface of the tank in sections or panels, with the layer of soft rubber cemented to the metal wall. The margins of adjacent panels usually overlap each other as longitudinally and transversely-extending joints. In the usual arrangement, one margin of the superposed soft and hard rubber layers of one panel overlaps the margin of the adjacent panel on one side and the other margin of the panel underlies the margin of the superposed soft and hard rubber layers of the adjacent panel on the other side. With this arrangement, the layers or panels of hard rubber are permitted to move relatively to each other and to the supporting metal wall by reason of the resiliency of the layer of soft rubber interposed between the hard rubber and the metal.

In those structures in which the layers or panels of hard rubber contact with the hard rubber layers of the adjacent panels, the hard rubber layers become amalgamated during vulcanization into one continuous or homogeneous sheet of hard rubber, so that the underlying layer or cushion of soft rubber cannot function to permit the panels of hard rubber to move relatively to each other and to the metal wall beyond the degree of contractibility of the hard rubber layer. Since the hard rubber to hard rubber contact at the overlapping joints converts the hard rubber panels into a continuous sheet of hard rubber, it is liable to crack when subjected to low temperatures, usually adjacent the overlapping joints. The moment the hard rubber cracks the underlying layer of soft rubber has also a tendency to open up below the crack in the hard rubber. To remedy this difficulty, it has been proposed to provide steel receptacles with superposed, soft, hard and soft rubber layers, overlapped in such manner that the hard rubber layers or panels do not contact with each other and there is a continuous coating of soft rubber over the hard rubber panels. But this arrangement is unsatisfactory when the tank is to contain corrosive or other liquids or gases which must not be brought into contact with soft rubber, either because the fluid may be contaminated by the soft rubber, or because the liquid (such as acetic or nitric acid) attacks and destroys the soft rubber, or because the temperature of the fluid—liquid or gas—is such that soft rubber would not be suitable.

One object of the present invention is to provide metal receptacles with a corrosion-resisting lining in which the panels or sections (and the connections between them) constitute a continuous sheet of hard rubber, but in which the overlapping joints between the panels are so constructed that the panels may move relatively to each other and to the supporting wall to a greater extent than has been possible in prior constructions in which there has been a hard rubber to hard rubber contact at the joints, thereby reducing to a minimum the likelihood of the hard rubber cracking in the panels when exposed to the low temperatures. To this end one feature of the invention resides in so constructing the joints that there is no direct contact between the hard rubber panels themselves, the overlapping margins of adjacent panels or equivalent layers of hard rubber being separated by a layer or lap of soft rubber preferably integral with the layer or cushion of soft rubber adherent to the metal wall. More specifically the inner edges or margins of two adjacent hard rubber panels lie spaced apart and in the same plane on a cushion of soft rubber which may be either the soft rubber layer adherent to the wall, or a lap integral therewith. In the first case there is an auxiliary strip of hard rubber separated from the margins of the adjacent panels by soft rubber laps integral with the soft rubber layer on which the adjacent panels rest. In the latter case, the auxiliary strip rests on the soft rubber layer cemented to the wall, the margins of the adjacent hard rubber panels overlap the margins of the auxiliary strip and are separated therefrom by soft rubber laps integral with the soft rubber layer. In both cases, since the adjacent hard rubber panels do not come into direct contact with each other and enclose the soft rubber layer or laps underlying the overlapping margin of the hard rubber panel, a strip of relatively thin hard rubber of high coefficient of expansion and high tensile strength is provided for protecting the exposed edges of the soft rubber laps. This thin strip of hard rubber, requiring a minimum of stress for its deformation or expansion, will freely expand when hard rubber panels contract at low temperatures; and even if in extreme cases, contraction of panels would be so great that the thin strip would break, the break would occur at a spot where it is least dangerous. There would still be a complete liner of hard rubber under this break which would safeguard the steel tank against the chemicals contained therein.

In the accompanying drawings, Fig. 1 is a perspective view of one corner of a metal tank to the inner surface of which has been applied a corrosion-resisting lining embodying the improved overlapping joint of the invention; Fig. 2 is a transverse section (on an enlarged scale) taken on the line 2—2 of Fig. 1 through one of the overlapping joints; Fig. 3 is a view similar to Fig. 2, but showing the conditions of the joint previous to vulcanizing the overlapping layers of soft and hard rubber; Fig. 4 is a view similar to Fig. 2, showing a modified form of joint; Figs. 5 and 6 are enlarged sectional details of one end of a joint similar in arrangement to that shown in Figs. 2 and 4, Fig. 5 showing the condition of the joint at normal room temperature, and Fig. 6 showing the condition of joint when subjected to a temperature of about −30° F.; and Fig. 7 is a section through one of the corners of the tank, taken on the line 7—7 of Fig. 1.

The tank or other receptacle to which the hard rubber lining of the present invention is adapted to be applied may be of any preferred shape and composed of any suitable material. The tank chosen for illustrating the application of the invention and of which a portion is shown in Fig. 1, is composed of steel or other metal and is an open-top structure having a bottom 10, side walls, one of which is indicated at 11, and end walls, one of which is indicated at 12. The upper ends of the walls 11 and 12 are provided with the outwardly projecting flanges 14. The top or inner surface of the bottom 10, the inner surfaces of the walls 11 and 12 and the top surface and outer edge of the flanges 14 are covered with a corrosion-resisting lining or coating consisting of superposed layers of soft and hard rubber, which is generally indicated at 15 in Fig. 1. The layer of soft rubber 16 is cemented on the metal and the layer of hard rubber 17 overlies the layer of soft rubber and forms the inner surface of the panels 15. It is not practical in lining the larger size tanks to apply a continuous duplex layer of soft and hard rubber to each side of the inner surfaces of the tank, and so the corrosion-resisting lining composed of the superposed soft and hard rubber layers is applied to the tank in panels or sections 19, the margins of adjacent panels being overlapped to form the longitudinally and transversely extending joints, generally indicated at 20 in Fig. 1, and in detail in Fig. 2. It is with the formation of this overlapping joint that the present invention is concerned.

The overlapping longitudinal and transverse joints indicated at 20 in Fig. 1 are duplicates of the joint shown in detail in Fig. 2. The cushion layer of soft rubber 16 is attached to the supporting wall 10 by cement 22. Superposed upon the soft rubber layer 16 and occupying a middle position 23 in the joint is an auxiliary panel of hard rubber 24, the edges of which are skived, as indicated at 25. Overlying the left hand end or margin of the panel 24 is a lap of soft rubber 26 integral with the soft rubber layer 16 and overlying the right hand end or margin of the panel 24 is a lap 27 also integral with the soft rubber layer 16. The free or inner ends of the laps 26 and 27 terminate short of the middle point of the panel 24 so as to leave a space between them. The inner end or margin 28 of the hard rubber panel 29 overlies the lap 26 of soft rubber, and the inner end or margin 31 of the adjacent hard rubber panel 32 overlies the lap of soft rubber 27. By reference to Fig. 3, which represents the parts of Fig. 2 in unvulcanized condition, it will be seen that the inner, spaced edges of the laps 26 and 27 and of the hard rubber panel margins 28 and 31, are skived at any oblique angle down to the inner or top surface of the auxiliary hard rubber panel 24. To protect the free ends of the soft rubber laps 26 and 27 against the action of liquids contained in the tank, they are covered by a strip 33 of relatively thin hard rubber compound about 1/64" to 1/32" thick of high coefficient of elongation and of high tensile strength. For convenience in applying the strip 33 to the ends of the laps 26 and 27, it also overlaps the free ends of the panel margins 28 and 31 and the open space on the top surface of the panel 24. During vulcanization, the strip 33 becomes amalgamated with the panel margins 28 and 31 and with the panel 24, as indicated clearly by the section lines in Fig. 2, leaving the thin strips 34 of hard rubber covering the free edges of the soft rubber laps or cushions 26 and 27, but also in effect extending onto the adjacent hard rubber surfaces.

The strip of hard rubber 34, thin relative to the thickness of the hard rubber panels 29 and 32, serves as a safety strip to prevent the continuous sheet of hard rubber lining from cracking at any point except at the thin strips 34 in case the temperature becomes so low that the hard rubber lining contracts beyond its point of coherence. In the former constructions of the single overlapping joint in which the end of the overlapping margin of one hard rubber panel was brought over the free end of the soft rubber lap into vulcanized adherence with the inner surface of the margin of the adjacent panel, cracks would appear usually at the point in the first hard rubber panel where it begins to overlie the soft rubber lap, and indicated at 35 in Fig. 2. As the underlying soft rubber splits under the crack in the hard rubber, the corrosive liquid filling the crack can thereby reach and attack the metal wall of the tank. In the present construction the thin safety strip of hard rubber is placed over the free end of the soft rubber lap. It will therefore be recognized that if a crack should occur in the safety strip (which would crack before the hard rubber panels) due to excessively low temperature conditions, the corrosive liquid would have to travel the full length of the soft rubber lap (which is many times the thickness of the soft rubber layer) as well as penetrate the thickness of the soft rubber layer before it could reach the metal wall. And with the improved double overlapping joint of the present invention affording twice as much contractibility relative to the metal walls of the tank as in the former single overlapping joint the likelihood of a crack occurring in a safety strip is slight. If the tank should temporarily be subjected to such low temperature as to develop a crack in a safety strip, a rise in the temperature would close the crack, and the effect of the crack would be negligible.

The application of the improved double overlapping joint shown in Fig. 2 to a right-angled corner of the tank is shown in small scale at 37 and 38 in Fig. 1, and in larger scale in Fig. 7. The arrangement is essentially the same as in Fig. 2, except that the various layers forming each half of the double overlapping joint, instead of being respectively on the same planes as those of the other half of the joint, are arranged at right angles to each other. Briefly, the corner arrangement shown in Fig. 7 comprises: The soft rubber layer 16 cemented to the bottom wall 10 of the tank continues as the soft rubber layer 40 adherent to the end wall 12, the corner 41 being provided with a fillet of soft rubber 42 the inner surface 43 of which is curved. The overlapping margin 45 of the hard rubber panel 32 overlies the lap 46 of soft rubber integral at one end with the soft rubber layer 16, its free end being covered by the safety strip 47. The soft rubber lap 46 overlaps the margin 48 of an auxiliary panel of hard rubber, generally indicated at 50. The other margin 51 of the panel 50 is overlain by the soft rubber lap 52 integral with the soft rubber layer 40. The lap 52 of soft rubber is overlain by the margin 53 of the hard rubber panel 54, which overlies the cushion of soft rubber 40. A safety strip 55 covers the free end of the soft rubber lap 52.

In the form of the invention shown in Fig. 2 (also in Figs. 1, 3 and 7), the auxiliary hard rubber strip cooperating with the margins of the large hard rubber panels or sections is almost entirely embedded in soft rubber, whereas the margins of the panels 29 and 32 simply overlie the soft rubber laps 26 and 27. In the form of the invention shown in Fig. 4, on the other hand, it is the margins of the hard rubber panels which are embedded in soft rubber, whereas the auxiliary strip of hard rubber simply overlies the soft rubber laps. Both forms of the invention have been used with success; however, the form shown in Fig. 2 is preferable, as it requires less pull to expand or move.

The double overlapping joint of the modified form of the invention shown in Fig. 4, comprises a continuous layer of soft rubber 57 cemented to the metal supporting wall 58. The margin or inner end 59 of the hard rubber panel 60 and the margin or inner end 62 of the adjacent hard rubber panel 63 are superposed upon the soft rubber layer, with their inner edges spaced apart as shown. Overlying the inner surface of margin 59 of panel 60 is a soft rubber lap 65 the right hand end of which is integral with the soft rubber layer 57 at the inner edge of the margin 59, and the other end of the lap is free. In like manner, the soft rubber lap 66 integral with the soft rubber layer 57 at the inner edge of the margin 62 of panel 63 overlies the inner surface of margin 62, the right hand end of lap 66 being free. It will be noted that there is a depression 67 between the inner ends of the soft rubber laps 65 and 66. Superposed upon the entire inner surface of the soft rubber laps is an auxiliary strip of hard rubber 68 the middle portion 69 of which is depressed to fit the depression 67. The outer or free ends of the auxiliary strip 68 and the soft rubber laps 65 and 66 are skived as a plane surface at an oblique angle with the inner surface of the hard rubber panels 60 and 63. Covering the free end of the soft rubber lap 65 is a thin safety strip of hard rubber 71 the end extensions of which run onto the adjacent surfaces of the hard rubber layers 60 and 68; and covering the free end of the soft rubber lap 66 is a thin strip of hard rubber 72 the end extensions of which are connected with the adjacent surfaces of the hard rubber layers 63 and 68. The depression in the middle of the double overlapping joint of Fig. 4 corresponds to the space between the inner edges of the panel margins 28 and 31 and the soft rubber laps 26 and 27 of Fig. 2, and aids in accommodating the expansion of the hard rubber layers as well as facilitating their contraction.

The enlarged sections of a single overlapping joint, or one half of a double overlapping joint, shown in Figs. 5 and 6 illustrate the condition of the joint at normal room temperature and sub-zero temperature. A layer of soft rubber 74 is cemented on the metal supporting wall 75. The margin 76 of a hard rubber panel 77 is superposed on the soft rubber layer. Overlying the inner surface of the margin 76 is a soft rubber lap 78 integral at one end with the soft rubber layer and free at the other end. The margin 80 of the adjacent hard rubber panel 81 also superposed on the soft rubber layer overlies the inner surface of soft rubber lap 78. The free ends of the margin 80 and lap 78 are skived as usual and a thin safety strip of hard rubber 83 covers the free end of soft rubber lap 78 and extends onto the adjacent surfaces of the hard rubber layers 77 and 80.

It is assumed that the tank or other receptacle is in a place where the temperature is about 72° F. and that the parts of the illustrated overlapping joint of the soft and hard rubber layers occupy the positions relative to each other shown in Fig. 5. If now, the temperature drops to about −25° F. all the parts shown in Fig. 5, including the steel wall 75 will contract, but the layers of soft and hard rubber will contract more than the wall 75 and the soft and hard rubber layers together with the protective strip of thin hard rubber 83 will occupy the positions shown in full lines in Fig. 6, their former positions in Fig. 5 being indicated by dotted lines.

In the foregoing description we have mentioned only the cracks which may be caused in the hard rubber lining by being exposed to extremely low temperatures, but cracks are also liable to appear in the hard rubber lining at relatively high temperatures under conditions where there is a continuous alternate heating and cooling of the hard rubber lining, which results in premature aging and shrinkage of the rubber compound.

The principle of the invention has been conceived to involve the idea that if it is impossible to prevent the inner layer or lining of hard rubber from cracking under any condition of service, the crack or cracks should occur at such points where it would be unlikely that leakage could penetrate to the steel shell of the tank, namely, at the free ends of the soft rubber laps. Accordingly, although the strip of relatively thin hard rubber which covers the free end of each soft rubber lap has been described as applied thereto as a separate, individual layer, because of facility of application, it will be understood that the same results may be obtained by skiving to the proper thickness the end of the overlying hard rubber lap and bringing it down onto the free or exposed end of the soft rubber lap. In this connection, it will be understood further, that the relatively thin extension from the outer hard rubber layer, although attached thereto, is not to be regarded as a part of the hard rubber lining performing the normal protective functions thereof, but only as a section of the lining located at a particular point and performing a special function brought about by unusual conditions of operation.

Having thus described the invention what we claim as new is:

1. An overlapping joint for a structure including a supporting wall and a layer of soft rubber adhering to the wall, comprising two hard rubber panels superposed for at least a part of their width on the layer of soft rubber and having adjacent margins the inner edges of which are spaced apart, an auxiliary strip of hard rubber overlapping said margins and spaced apart therefrom, a lap of soft rubber integral at one end with the layer of soft rubber and free at the other end interposed between the margin of one of said hard rubber panels and one end of said auxiliary strip, a second lap of soft rubber integral at one end with the soft rubber layer and free at the other end interposed between the margin of the second hard rubber panel and the other end of the auxiliary strip, and a relatively thin strip of hard rubber covering the free end of each soft rubber lap.

2. In an overlapping joint for a structure including a supporting wall and a layer of soft rubber adhering to the wall, two panels of hard rubber superposed upon the layer of soft rubber and having the inner edges of their adjacent margins spaced apart, two laps of soft rubber extending from the layer of soft rubber at the point between the edges of the panels overlying the edges and the inner surface of the margins of the panels, an auxiliary strip of hard rubber overlying the laps of soft rubber, the side edges of the auxiliary strip and the free ends of the soft rubber laps terminating in a flat plane, and a strip of relatively thin hard rubber covering the flat end of each lap of soft rubber.

3. An overlapping joint for a structure including a metal supporting wall and a layer of soft rubber cemented to the wall, comprising, two adjacent panels of hard rubber superposed upon the soft rubber layer with the inner edges of their adjacent margins spaced apart, a lap of soft rubber integral at its inner end with the layer of soft rubber and free at its outer end overlying the inner edge and the inner surface of the margin of one panel, a second lap of soft rubber integral at its inner end with the layer of soft rubber and free at its outer end overlying the inner edge and the inner surface of the margin of the other panel, the inner surfaces of the laps of soft rubber being on substantially the same plane, there being a depression between the laps at the point where they are integral with the layer of soft rubber, an auxiliary strip of hard rubber covering the inner surface of the laps of soft rubber but terminating above their outer ends, the middle portion of the auxiliary strip being sunk into the depression between the laps, the side edges of the auxiliary strip and the outer ends of the laps of soft rubber being skived at an oblique angle to the inner surface of the hard rubber panels, and a strip of relatively thin hard rubber covering each outer lap end and extending onto the adjacent hard rubber surfaces.

4. A structure of the character described comprising a wall, a plurality of panels of superposed layers of soft and hard rubber with the soft rubber against the wall, the inner margins of the panels of hard rubber being spaced apart, an auxiliary strip consisting of superposed layers of soft and hard rubber with the middle portion of the soft rubber layer against the wall and occupying the space between the inner margins of the panels of hard rubber, the under surface of the margins of the soft rubber layer of the auxiliary strip overlying the upper surface of the inner margins of the hard rubber layer of the panels and a relatively thin strip of hard rubber covering each outer end of the soft rubber layer of the auxiliary strip.

5. A structure of the character described comprising a wall, a covering for the wall consisting of a layer of soft rubber against the wall, a plurality of panels of hard rubber on the soft rubber the inner margins of which are spaced apart, an auxiliary strip consisting of a layer of hard rubber the outer margins of which overlap the inner margins of the hard rubber panels and being spaced apart therefrom and a layer of soft rubber connected with the first layer of soft rubber interposed between the inner margins of the hard rubber panels and the outer margins of the hard rubber layer of the auxiliary strip and a layer of relatively thin hard rubber on the free end of each soft rubber layer of the auxiliary strip.

HERMAN J. SCHELHAMMER.
WALTER HIEMANN.